Aug. 13, 1940.  S. HAMMER  2,211,620
APPARATUS FOR MANUFACTURING VENETIAN BLINDS
Filed April 15, 1936  9 Sheets-Sheet 1

INVENTOR.
Samuel Hammer
BY
Bohleber + Ledbetter
ATTORNEYS.

Aug. 13, 1940.   S. HAMMER   2,211,620
APPARATUS FOR MANUFACTURING VENETIAN BLINDS
Filed April 15, 1936   9 Sheets-Sheet 4

INVENTOR.
Samuel Hammer
BY
Bohleber + Ledbetter
ATTORNEYS.

Aug. 13, 1940.　　　　S. HAMMER　　　　2,211,620
APPARATUS FOR MANUFACTURING VENETIAN BLINDS
Filed April 15, 1936　　　9 Sheets-Sheet 5

INVENTOR.
Samuel Hammer
BY
Bohleber + Ledbetter
ATTORNEYS.

Aug. 13, 1940.                S. HAMMER                 2,211,620
            APPARATUS FOR MANUFACTURING VENETIAN BLINDS
                    Filed April 15, 1936         9 Sheets-Sheet 6

INVENTOR.
Samuel Hammer
BY
Bohlebw+Ledbetter
ATTORNEYS.

Aug. 13, 1940.   S. HAMMER   2,211,620
APPARATUS FOR MANUFACTURING VENETIAN BLINDS
Filed April 15, 1936   9 Sheets-Sheet 7

INVENTOR.
Samuel Hammer
BY
Bohlen & Ledbetter
ATTORNEYS.

Aug. 13, 1940.　　　　S. HAMMER　　　　2,211,620
APPARATUS FOR MANUFACTURING VENETIAN BLINDS
Filed April 15, 1936　　　9 Sheets-Sheet 9

INVENTOR.
Samuel Hammer
BY Bohleber & Ledbetter
ATTORNEYS.

Patented Aug. 13, 1940

2,211,620

UNITED STATES PATENT OFFICE 2,211,620

APPARATUS FOR MANUFACTURING VENETIAN BLINDS

Samuel Hammer, Brooklyn, N. Y., assignor to United Metal Box Co., Inc., Brooklyn, N. Y., a corporation of New York Application April 15, 1936, Serial No. 74,601

17 Claims. (Cl. 270—79)

This invention relates to a preferred method and form of apparatus for pleating or gathering into an accordion-like pleat and gripping in a magazine Venetian blind tapes in which slat engaging elements have been previously inserted for the purpose of subsequently fastening said tapes at spaced intervals to a plurality of slats.

An important object of my invention is to provide a novel method of constructing and assembling Venetian blinds of a type which can be manufactured in large quantities and sold at a cost below those offered on the market at the present time, and to provide suitable mechanism for facilitating the construction and assembly of such blinds.

Another object of my invention is to provide improved methods and mechanisms for using, in the construction of Venetian blinds, what may be described as single supporting tapes, as distinguished from double or so-called ladder tapes, heretofore used in the manufacture of such blinds, and while there are many ways of fastening such tapes to the slats I prefer to use means for securely fastening the tapes to the edge faces of the slats by clips or other slat engaging elements which may easily be removed as occasion requires.

Other objects and advantages of my invention will either become apparent or be referred to specifically in the following description thereof wherein reference is made to the accompanying drawings, in which:

Figure 6 is an enlarged right-hand end view of the upper or table portion of the machine shown in Figures 1 and 2.

It will be understood that a Venetian blind, such as referred to herein, comprises what is generally described as a head bar mounted in any suitable manner at the top of a window. A series of slats, terminating in a lowermost slat, is suspended from the head bar by any suitable form of flexible members, such as tapes, usually secured to an uppermost tiltable slat from which all of the other slats are supported. All of the slats and the head bar are perforated to permit the passage therethrough of raising and lowering cords secured to the lowermost slat and disposed by guide pulleys located in the head bar in an accessible position at one side of the blind. Inasmuch as my present invention relates particularly to the assembly of Venetian blind slats and their supporting tapes and means and methods for facilitating the same, it is believed unnecessary to illustrate the complete blind, particularly in view of the following description.

A tape 20, comprising a plurality of spaced tubular loops or casings 21 secured in any suitable manner at one side thereof, is shown in Figures 3 to 7. In the example shown, the loops 21 are woven integral with the tape. It will be understood that the distance between the loops 21 is equal to the desired distance between the slats of an assembled blind when the same are open or lowered, so to speak. The drawings also illustrate what I shall describe as a spring clip 22 or slat engaging element by which the tape 20 is secured or fastened at spaced intervals to the edge faces, respectively, of the plurality of slats of the blind.

Figure 8:
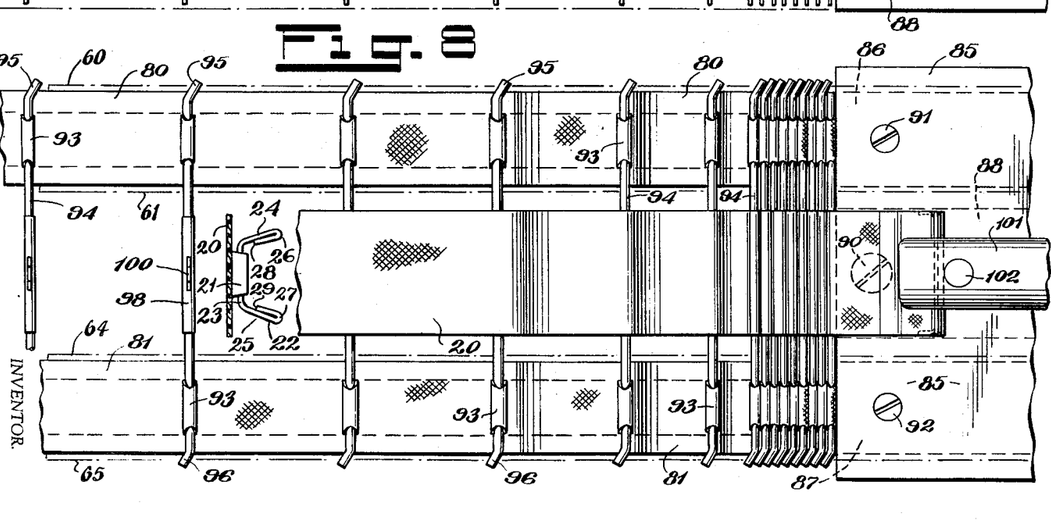
Figure 9:
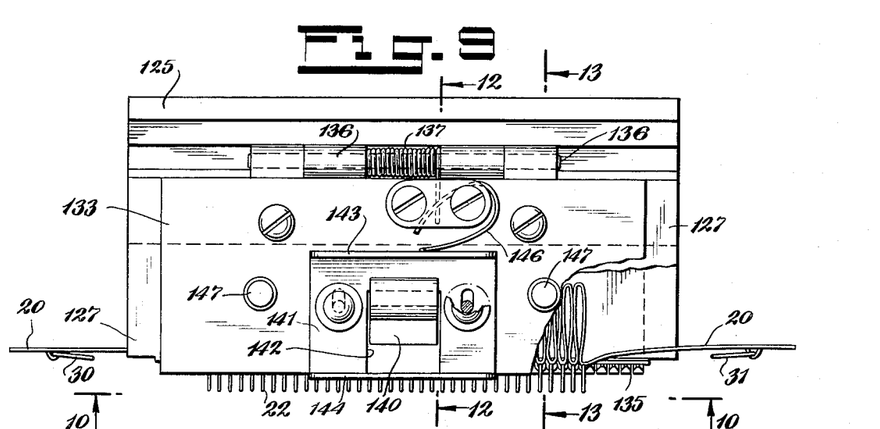
Figure 9 is an elevational view of a tape magazine with a portion broken away to illustrate a gathered tape disposed therein with the clips held in regular spaced alignment.
Figure 10:
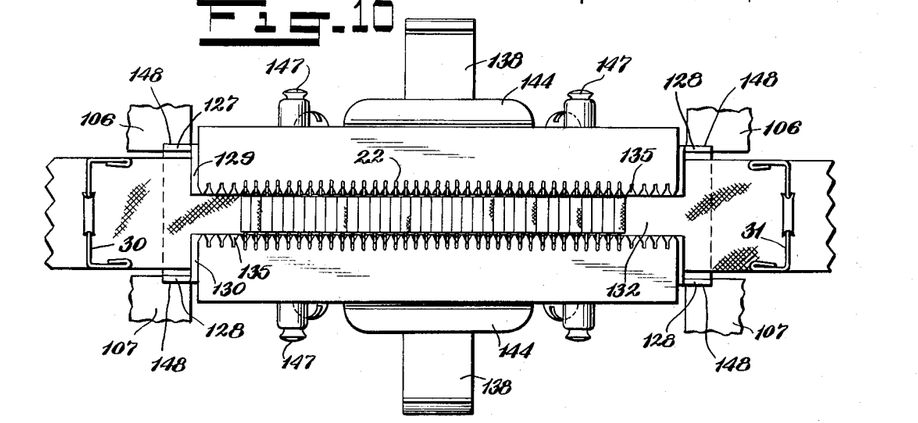
Figure 10 is a view of a magazine and a gathered tape disposed therein taken on line 10—10 of Figure 9 and looking in the direction of the arrows, and including portions illustrating the manner in which the same is mounted on the gathering machine.

The clips 22, see detail in Figure 8, are preferably made of a piece of spring wire having a cross bar 23 with the ends thereof bent to form arms 24 and 25 having hooks 26 and 27 formed thereon by bending a portion of the arms inwardly until ends 28 and 29 of the hooks are spaced a short distance from the cross bar 23. It will be understood that when the clip is bent as described the parts 23 to 29 are all disposed in the same plane and form what may be described as a staple-like structure having a head 23 and two points 26 and 27, mounted on the tape 20; and in the example here shown by means of the tubular loops 21. All of the clips used throughout the length of the tape are of the same size and proportion except those disposed at the ends thereof, as shown in Figures 9 and 10 at 30 and 31, which have a cross bar 23 or head portion longer than the cross bar 23 above described. While other structures embodying my invention may be constructed, the preferred tape and clip structure, per se, forms the subject matter of my copending application Ser. No. 74,602, filed April 15, 1936.

After the clip is formed it is adapted to be pressably inserted into perforations formed in the edge faces of the slats and be secured therein by the engagement of ends 28 and 29 with the edges of the perforations. The proportions of these clips and the size and position of the perforations are such that after the clips are disposed in the perforations they may be flexed sufficiently to unhook and remove one end thereof, whereupon the clip then may be manipulated so that the other end can also be removed.

*Pleating or gathering mechanism*

Referring now to Figures 1 to 7 I shall describe what, for the want of a better name, may be referred to as a tape pleating or gathering mechanism or gathering table, which in the example illustrated is approximately eight feet long. This mechanism comprises a pair of parallel side rails 35 and 36, secured together at spaced intervals by means of end plates 37 and intermediate plates 38. The table is mounted in any suitable manner upon a supporting structure; shown by way of example as leg means 39 and 40. Between the rails 35 and 36 is disposed a vertically movable bottom plate or carriage 41 extending the full length of the table; which when disposed in its lowermost position is adapted to rest on the plates 37 and 38. The bottom 41 is freely movable on vertical guide pins 42 and 43, see Figures 4 and 6, fixed in the end plates 37 and adapted to prevent the longitudinal displacement of the plate 41.

Figures 1, 2:
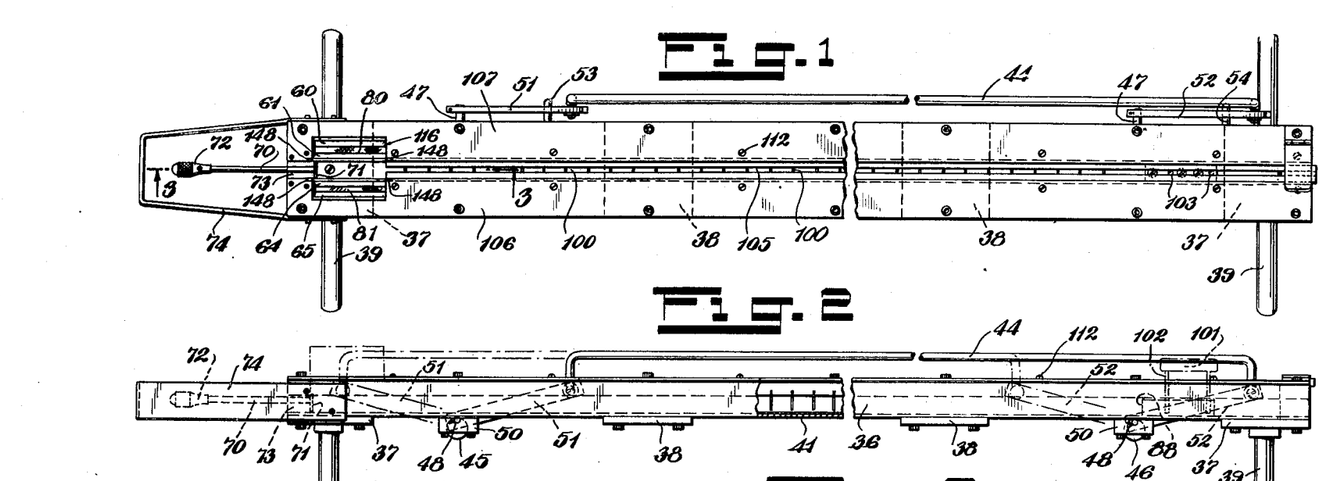
Figures 1 and 2 show plan and elevational views, respectively, of a machine in which a flexible tape, preferably made of fabric and having staple-like spring clips securely disposed thereon at spaced intervals may be gathered together with all the clips disposed in regular alignment and held at closely spaced intervals with respect to one another so that all of said clips may be grasped simultaneously in a tape magazine.
Figure 3:
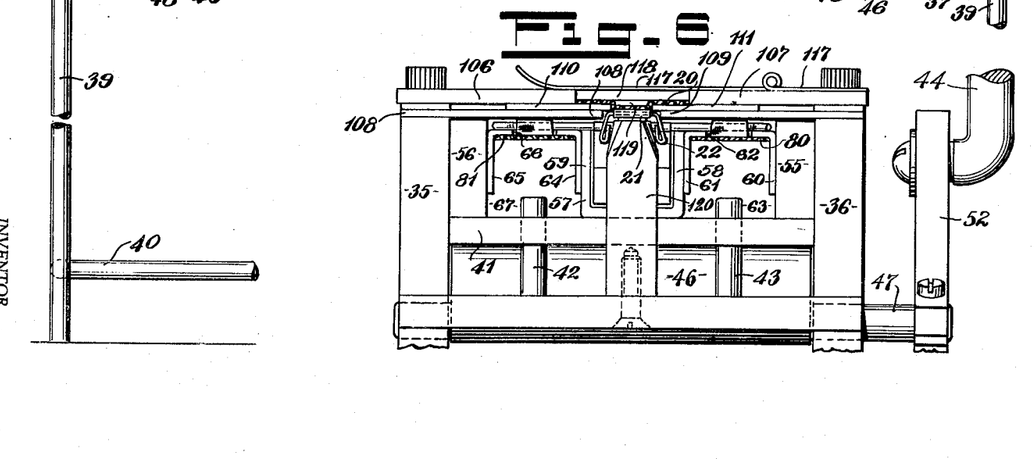
Figure 3 is a sectional view taken on line 3—3 of Figure 1, and looking in the direction of the arrows, including an elevational view of a tape magazine disposed in position to receive a gathered tape.

A cam mechanism operated by a long handle or bar 44 is provided for elevating the bottom 41 for a purpose to be hereinafter described. This cam mechanism comprises a pair of eccentric rollers 45 and 46 each of which have journals 47 and 48 mounted in bearings 49 and 50 secured to the rails 35 and 36. Arms 51 and 52, each having one end secured respectively to the journals 47 and the other end secured respectively to the handle 44 complete the cam mechanism for raising and lowering the bottom plate 41. It will be understood that the eccentric portions of the cams 45 and 46, when rotated, are adapted to move freely between the rails 35 and 36 and lift the bottom 41 along the guide pins 42 and 43 above the plates 37 and 38 and support the same in an elevated position above said plates at a distance approximately equal to the throw of the cam. Figures 1, 2 and 3 show the bottom 41 and cam mechanism in its lowermost position with the handle 44 disposed toward the right-hand end of the machine and with the arms 51 and 52 resting on stop pins 53 and 54. Figure 2 illustrates, in dotted lines, the position occupied by the handle 44 and arms 51 and 52 when the cams are elevated and the bottom plate 41 is disposed in the position shown in Figure 6.

Figures 3, 4, 5:
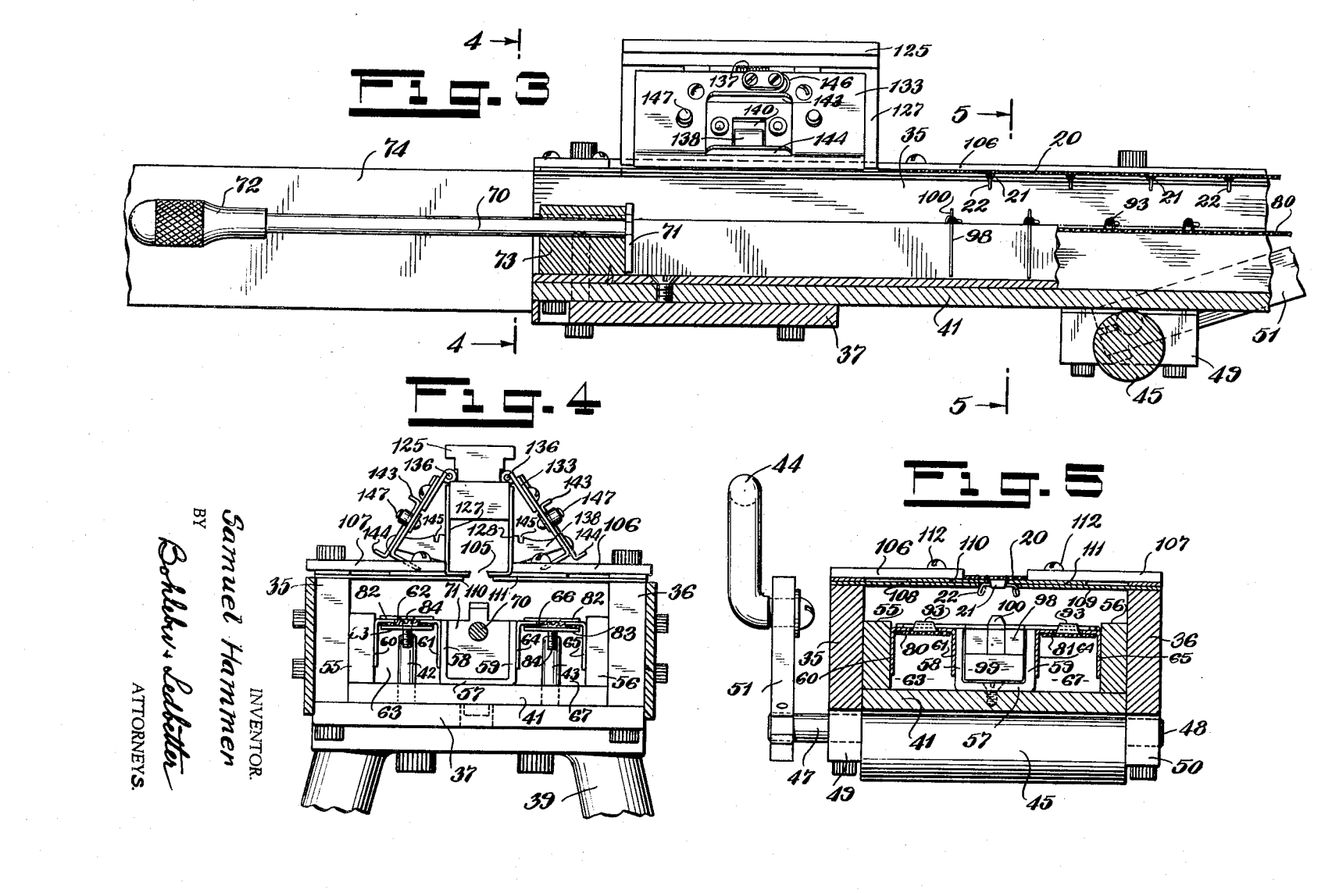
Figures 4 and 5 are sectional views taken on lines 4—4 and 5—5 respectively of Figure 3 and looking in the direction of the arrows.

Referring now to Figures 4, 5 and 6 it will be seen that free standing rails 55 and 56 are secured respectively along each side of the bottom 41. Along the center of the bottom and between the rails 55 and 56 is secured a member 57 of channel or U-shaped cross section with the sides 58 and 59 thereof projecting upwardly. For reasons to be hereinafter described, the sides 58 and 59 terminate in a plane slightly below that defined by the upper edges of the rails 55 and 56. Angle strips 60 and 61, secured respectively to the rail 55 and side 58, serve to form a restricted longitudinal opening 62 leading to a space 63 formed between the rail 55 and the channel side 58. Similar angle strips 64 and 65 form a restricted longitudinal opening 66 leading to a space 67 formed between rail 56 and channel side 59. It will be noted that the upper surfaces of the legs of the angle strips forming the openings 62 and 66 are disposed in the same plane as the upper edges of the channel sides 58—59.

A drag 70 having a head 71 on one end and a handle 72 on the other is slidably mounted in a block 73 secured in the channel member 57 at the extreme left-hand end thereof. The head 71 is preferably made of a form adapted slidably to fit within the channel member 57. A guard 74 is secured to the end of the table to prevent the drag from accidentally being bent out of alignment. The purpose of this drag will be described presently.

Figure 7:
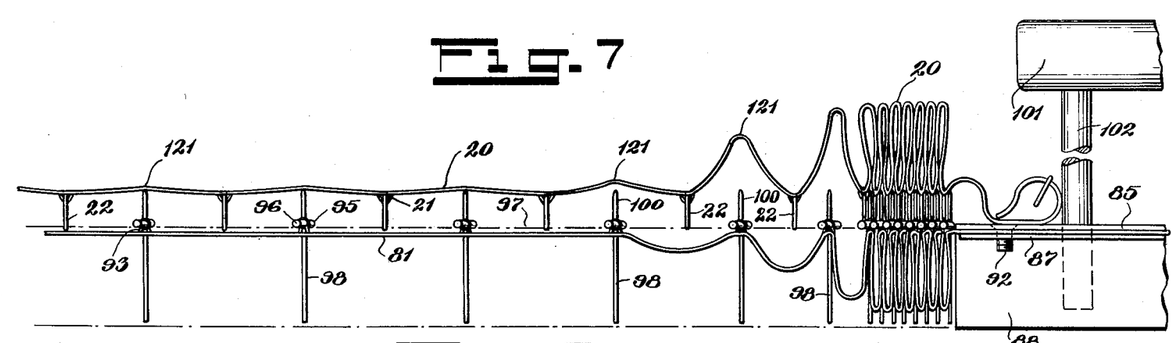
Figures 7 and 8 are elevational and plan views, in more or less diagrammatical form, showing details of the mechanism illustrated in Figures 1 and 2.

Mounted on the bottom 41 is what I shall describe as a slidably extendable and contractible pleating or gathering conveyor comprising a pair of fabric tapes 80 and 81, see Figures 6, 7, and 8, each of which is approximately as long as the gathering table, and disposed respectively in spaces 63 and 67. One end of each tape 80 and 81 is securely clamped at the left-hand end of the table beneath the projecting sides of the angle strips 60—61, and 64—65, respectively, in any suitable manner such as by means of plates 82 and 83, and screws 84, see Figure 4. The other ends of the tapes 80 and 81 are secured by means of a cap plate 85 and clamping plates 86 and 87, see Figures 7 and 8, to a movable block 88, adapted to slide throughout the length of the table in the trough of the channel member 57. The cap plate 85 is secured to the block 88 by means of screws 90, one of which is shown in Figure 8. The right-hand end of the tape 80 is secured to one side of the cap plate 85 by means of screws 91 and the plate 86 and the corresponding end of the tape 81 is secured to the opposite side of the plate 85 by means of screws 92 and the plate 87. The tapes 80 and 81 are substantially the same as tapes 20 above described in that they each comprise a plurality of spaced tubular loops or casings 93, see Figures 5 and 8. It will be understood that when one end of each of the tapes 80 and 81 is secured, respectively, to the left-hand ends of the angle strips 60—61 and 64—65 and the other ends of said tapes are secured, respectively, to the movable blocks 88, the loops 93 will be disposed within the restricted longitudinal openings 62—66, see Figures 5 and 6, with the loops 93 on tape 80 directly opposite the correspondingly numbered loops on the tape 81.

A plurality of rods 94, each having ends 95 and 96 bent in opposite directions in the plane of the rod, are disposed in the loops 93 and serve as supports to hold the tapes 80 and 81 throughout the length of the table in engagement with the under side of the angle strips 60—61 and 64—65, respectively. A dotted line 97 in Figure 7 illustrates the top surface of the angle strips on which the rods 94 are adapted to slide as they support the tapes 80 and 81. In Figure 8 the angle strips 60—61 and 64—65 are shown in dotted lines.

A flag having a weighted lower edge 98 and a folding point 100 disposed on the upper edge thereof, is rigidly mounted on each rod 94 and adapted to hang vertically from the rod in the channel 57. A handle 101 having pins 102 adapted to fit in holes 103 in the block 88 is provided for extending and contracting the pleating or gathering conveyor in a manner to be hereinafter described.

From the above it will be understood that when the block 88 is pulled to the right-hand end of the machine by means of the handle 101 the tapes 80 and 81 will be stretched taut throughout the length of the table and slidably supported in that position at spaced intervals by means of the rods 94 as shown at the left-hand ends of Figures 7 and 8. This may be referred to as the extended position of the conveyor. The movable block 88 may also be pushed toward the left-hand end of the table whereupon the tapes 80 and 81 will be pleated or folded in the form of a succession of loops and disposed respectively in the spaces 63—67 with the top of each loop supported under the angle strips by means of the loops 93 and rods 94, see Figure 7. The reasons for bending the ends of the rods as described is to reduce the tendency for them to roll as they slide back and forth on the angle strips and also to make the flags 98 and points 100 stand uprightly in the trough when the conveyor is slidably extended or contracted therein. Finally, by bending the rods, as above described, they are adapted to nest closely together side by side as shown at the right hand end of Figures 7 and 8.

The space above the bottom 41 is closed except for a centrally disposed slot 105 of irregular cross section, see Figures 1 and 4, extending from one end of the table to the other and in which, as will hereinafter be described, the tape 20 is adapted to fit slidably with the clips 22 hanging vertically downward with the cross bars 23 or head portion thereof disposed in the loops 21 and positioned centrally of the tape. While this slot could be made otherwise, it is here shown as being formed by a plurality of spaced guide strips comprising plates each having one edge thereof secured respectively to the top edge of the side rails 35 and 36, and a pair of strips. The opposed edges of all of these pieces project inwardly to form the slot 105. The upper plates 106 and 107 are comparatively heavy and because of their function of guiding the edges of the tape 20, may be described as tape edge guide plates. The plates 108 and 109, because of their function of centralizing the clips 22 in the loops 21, may be referred to as clip guides. Strips 110 and 111 are secured respectively to the plates 106 and 107 by means of screws 112, see Figures 1 and 2, and form a support for the tape 20 when it is pulled into the slot 105. It will be noted that the distance between the apposed edges of strips 110 and 111 is approximately equal to the length of the loops 21 and that the thickness of said plates is such as to permit the tape 20 to be disposed in the slot 105 while resting on the edges of the strips 110—111 with the edges of said strips disposed above the cross bars 23 of the clips 22, see Figures 5 and 6. At the left-hand end of the table the slot 105 opens into a rectangular magazine opening 116 formed by the strips just described. It will be noted that for the length of the opening 116 there are no cross bars 94 and flags 98.

Hinged at the extreme right-hand end of the table is a guide member 117 for facilitating the disposition of the tape 20 in the slot 105, that is, after one end of the tape 20 is laid flat on the strips 110 and 111 with the edges adjacent the plates 106 and 107, and with the first clip started under said strips, the guide member 117 may be dropped down as shown in Figure 6, over the right-hand end of the slot 105 to warp or cause a slight camber in the tape, as it is drawn into the slot 105. The guide member 117 comprises, for this purpose, a plate 118 secured thereto and adapted to lie upon the tape 20 and hold it flat against the strips 110 and 111. A block 119 is disposed centrally of the plate 118 for the purpose of depressing the central portion of the tape 20 as the same is drawn into the slot 105. A post 120 secured at the right-hand end of the table to the plate 37, see Figure 6, stands with the upper end thereof disposed centrally of the slot 105 and serves as a further guide for the clips as the tape is drawn into the slot 105.

From the above it will be understood that, when the tapes 80 and 81 of the conveyor are extended the length of the table by moving the block 88 to the right and the handle 101 is removed, a Venetian blind tape 20 may be drawn or threaded longitudinally into the slot 105, as shown in Figure 3, with the clips hanging downwardly above the flags of the conveyor. Now, when the handle 44 is moved to the left, as shown in Figures 1 and 2, the bottom 41 carrying the conveyor and flags 98 is elevated bodily to dispose each of the points 100 in the slot 105 and cause said points, respectively, to make a slight crease, or initial bend 121 in the tape 120 between each pair of clips 22. Thereafter, the handle 101 with its pins 102 extending through the slot 105 may be placed in the block 88 and the conveyor slidably contracted to the left-hand end of the machine causing the tape 20 to be progressively folded or gathered, in a zig-zag manner as shown in Figure 7, with all of the clips disposed in alignment at one side thereof and in close spaced relationship with one another.

When the handle 44 is moved to the right, the amount of the elevation of the bottom 41 is limited by the upper edges of the rails 55 and 56 coming to rest against the plates 108 and 109. It will now be understood that the reason for making the sides 58 and 59 of the channel member 57 lower than the rails 55 and 56 is to provide a clearance space below the plates 108—109 in which the rods 94 may slide freely back and forth when the bottom is elevated for the reasons above described.

Tape magazine

Referring now more particularly to Figures 9 to 14, I shall describe what I regard as a preferred structure and operation of a tape magazine for gripping or holding all of the slat engaging elements of a blind tape in predetermined spaced relation after the same has been pleated by the mechanism above described. This tape magazine comprises a body portion made of a plurality of parts 125 and 126 of any suitable material although it may, if desired, be constructed of a single properly shaped block. The upper part 125 of the body portion is of T-shaped cross section adapted to fit slidably and snugly into similarly shaped slots, to be hereinafter described, the part 126 being secured thereto by screws not shown. Rigid sides 127 and 128 having inwardly turned flanges 129 and 130 are secured to and project downwardly from the sides of part 126 to form a rectangular tubular cavity 131 having a slot 132 at the bottom thereof, see Figure 14. Hingeably secured to each side of the magazine body is a side piece or jaw 133 having an inwardly turned flange 134 provided with a plurality of equally spaced notches or comb-like teeth 135, formed in the edge thereof, see Figure 10. In the device here shown the center distances between these notches is approximately .098 inch, but it will be understood that this distance bears a relation to the thickness of the blind slats to be hereinafter described and may be varied when it is desired to use, in the construction of blinds, slats of different thicknesses.

Figure 11:
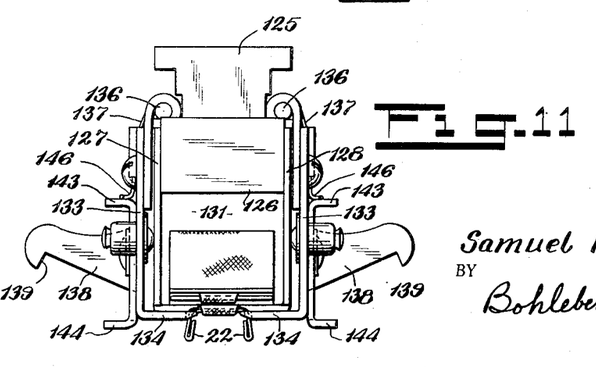
Figure 11 is an end view of the magazine shown in Figure 9.
Figure 12:
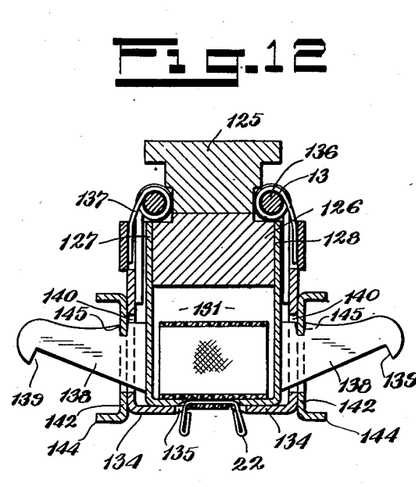
Figures 12 and 13 are sectional views taken on lines 12—12 and 13—13, respectively, of Figure 9 and looking in the direction of the arrows.
Figure 13:
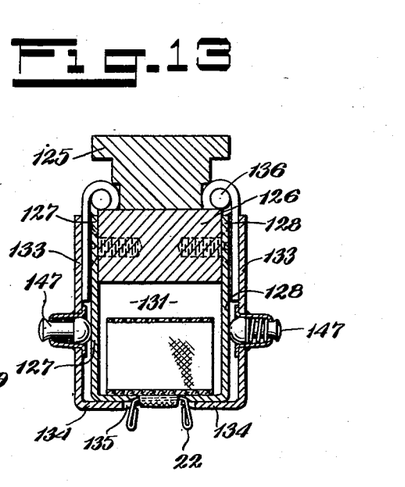
Figure 14:
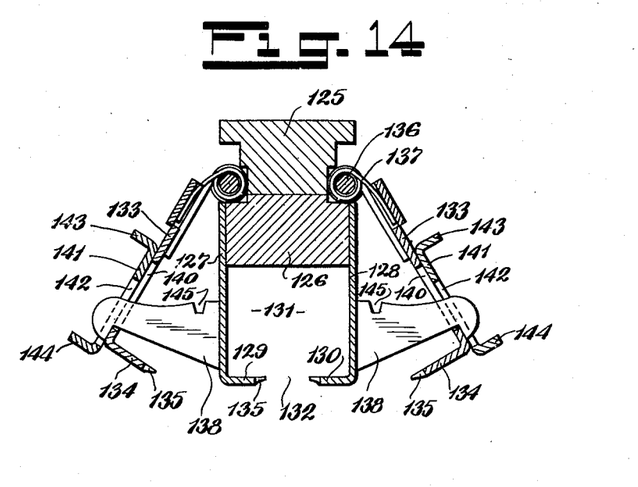
Figure 14 is a sectional view of the magazine similar to that shown in Figure 12, except that the tooth members for holding the clips of the tape are shown in opening position.

Hinges 136 for securing the side pieces 133 to the body of the magazine comprise any suitable spring means 137 tending to bias the sides 133 into open position, as shown in Figure 14. Arms 138 secured respectively to the sides 127 and 128 and having hooks 139, see Figures 11 and 12, are adapted to pass through openings 140 in the sides 133 and serve as stops to limit the opening movement of the toothed sides 133. A slide catch or latch 141 forming an opening 142 and having an upper and lower outwardly turned flange 143 and 144 is secured by any suitable lost-motion connection, see Figure 9, to each side piece 133. The upper edge of the opening 142 in catch 141 is adapted to cooperate with notches or keepers 145 formed in the arms 138 to lock the side pieces in closed position with the flanges 134 in apposition and disposed immediately below the flanges 129 and 130 forming the slot 132, see Figures 11, 12 and 13. A spring 146 is mounted above each slide 141 to cooperate with the flanges 143 and urge the slide downwardly so that when the sides 133 are in closed or locked position the upper edge of the opening 142 of the slide catches 141 are disposed in the notches 145 for a purpose to be hereinafter explained. The flanges 144 are disposed below the lower surfaces of the flanges 134, also for a purpose to be hereinafter explained. Spring pressed plungers 147, adapted to yieldably engage the sides 127 and 128, are mounted on the sides 133 in any suitable way to increase the pressure necessary to close and latch the sides 133 in the position shown in Figure 13. The plungers 147 also serve as a yieldable stop for positioning the sides 133 in closed position and thereby facilitate the latching engagement of the opening 142 and notch 145 above described.

In Figures 9 and 10 it will be seen that each end of the sides 127 and 128 extends beyond the flanges 129 and 130. These ends are adapted to fit in notches 148 formed in the plates 106 and 107 at each end of the opening 116 of the table, see Figures 1, 3 and 10, to locate the magazine on the table with the slot 132 in alignment with the table slot 105 and with the flanges 129—130 in direct alignment with the ends of the strips 110 and 111.

In order to load a magazine as shown in Figures 9 to 12, an open empty magazine like that shown in Figure 14 is first disposed in the notches 148, see Figures 3 and 10, and the drag 71—72 is moved to the right across the opening 116. A tape 20, after the same has been progressively gathered as above described and illustrated in Figures 7 and 8, is then pushed as a unit into the cavity 131 of the magazine. The tape 20, between the clips 22, will be looped upwardly like that shown at the right-hand ends of Figures 7 and 9 with all the clips disposed in the magazine slot 132, and held erect in spaced relationship with respect to one another by the flags 98, see Figure 7. The thickness of the clips and flags is such that the center distance between the clips of the gathered tape will be .098 inch or, in other words, equal to the pitch of the teeth 135 on the flanges 134 above described. The purpose of the drag 71—72 is to offer resistance to the unit of gathered tape as the same is pressed into the magazine. The resistance thus offered by the drag 71—72 and the force necessarily applied to the block 88 in collapsing the tape 20 and to push the same into the magazine is sufficient to confine the clips 22 and tape 20 so closely together that the magazine sides 133 may thereafter be closed and latched and confine the adjacent clips in pairs of oppositely disposed notches 135, see Figures 9 to 13. After the magazine is thus loaded, so to speak, with a gathered tape 20, it may be lifted out of the notches 148 for use in a subsequent operation of assembling the tape 20 to the slats of the blind, to be hereinafter described. It will be understood that thereafter the conveyor, comprising tapes 80 and 81, may be moved to the left of the table and the handle 101 removed from the block 88, whereupon the bottom 41 is lowered by moving the handle 44 to the left and a new tape 20 threaded into the slot 105 and the operation of gathering the same and loading it into another magazine may be repeated as above described. It will be understood that I contemplate using a plurality of magazines like those above described as a matter of convenience in commercially assembling my Venetian blinds.

Figures 15, 16:
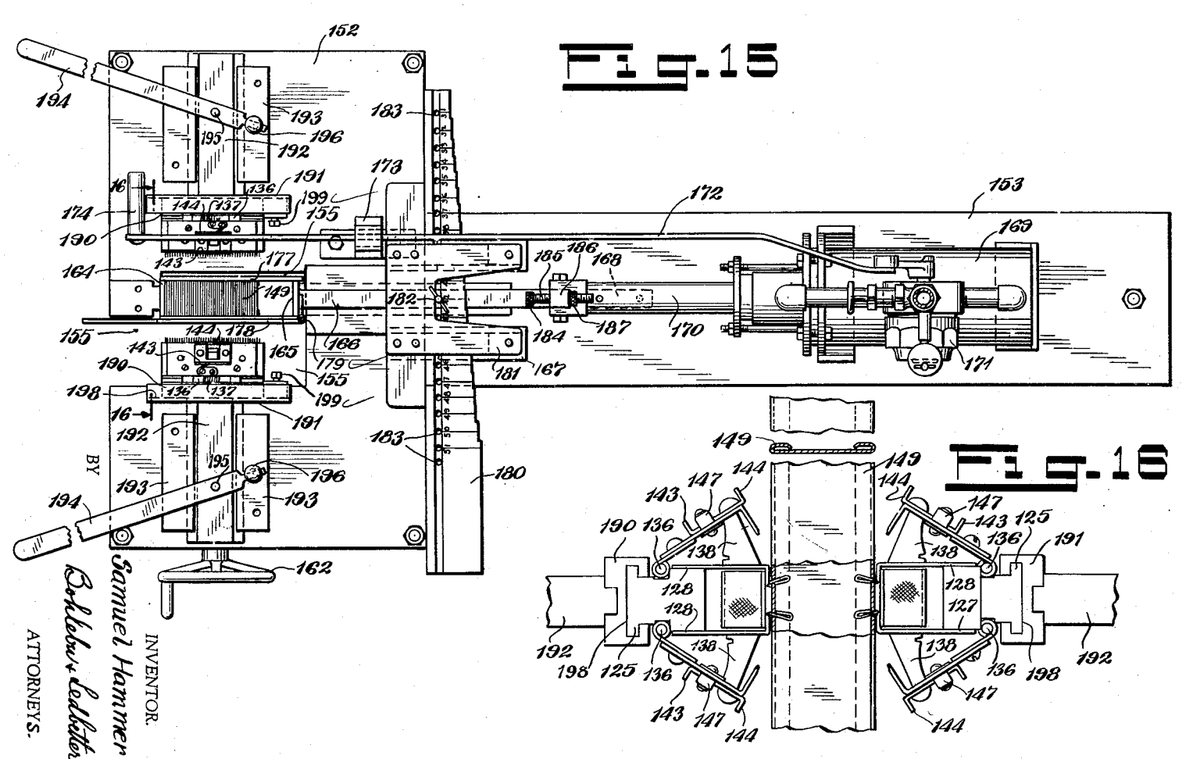
Figure 15 illustrates a plan view of a machine for gripping a plurality of Venetian blind slats and holding the same in position to receive from a loaded tape magazine a plurality of clips and otherwise illustrates a manner of finally assembling the tapes and slats.
Figure 16 is an enlarged view taken on line 16—16 of Figure 15, showing the magazines in open position and showing the gathered tapes secured to a bundle of slats by means of the clips cooperating with perforations in the edge face of the slats.
Figures 17, 20:
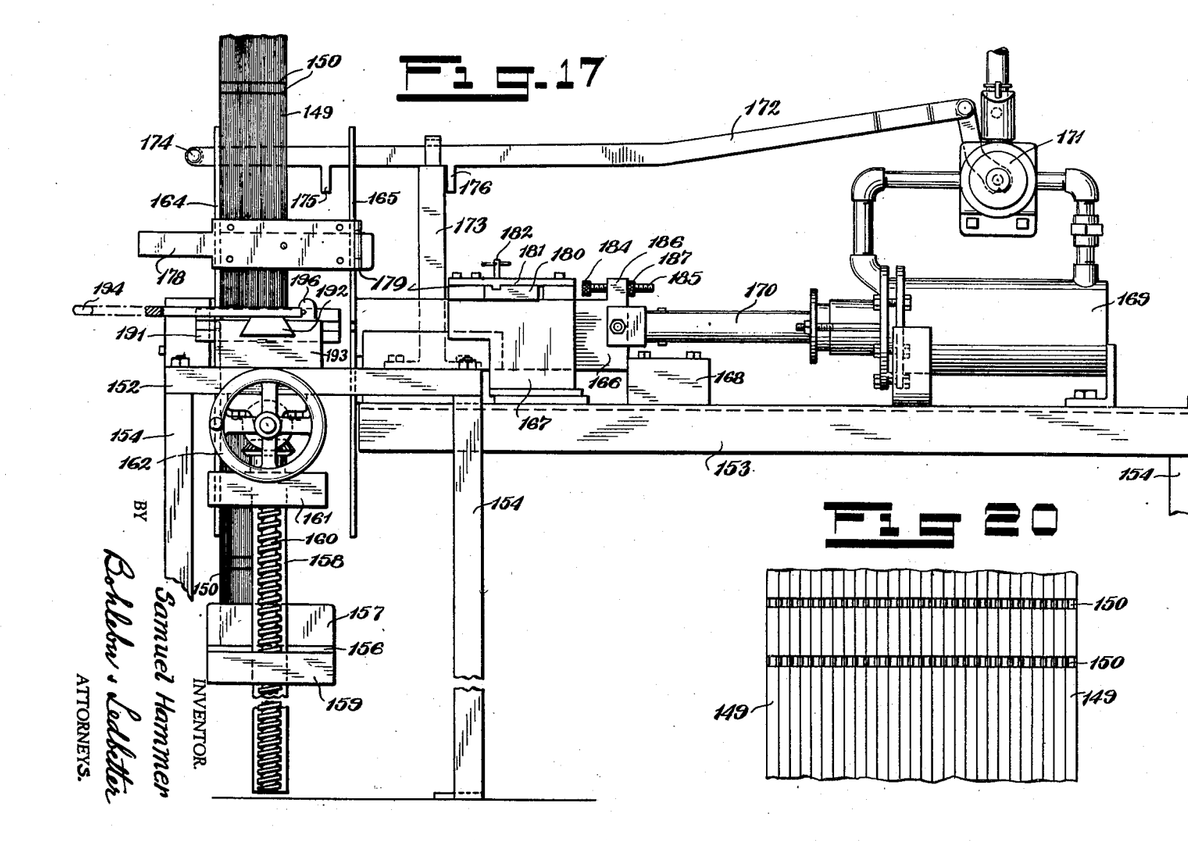
Figures 17 and 18 show elevational and end views respectively of the machine shown in Figure 15.
Figure 20 is a fragmentary view of a plurality of slats bundled together as they are in the machine shown in Figure 17 and showing the regular arrangement and spacing of the clip holes or perforations in the edge face thereof.
Figure 21:
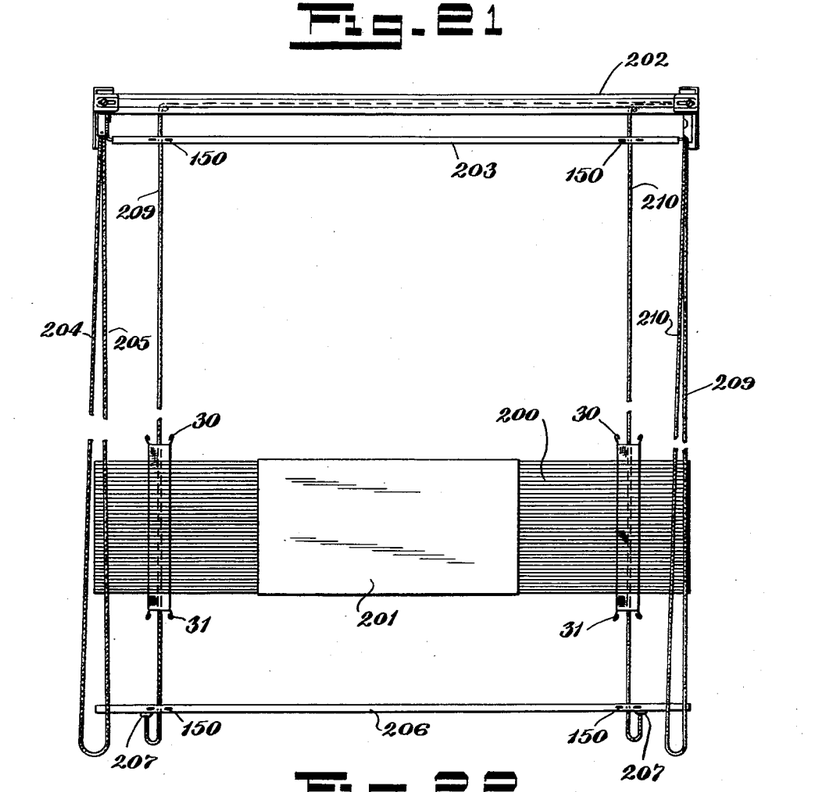
Figure 21 is a diagrammatic view illustrating the manner of assembling to a head bar comprising a tilting slat, by means including raising and lowering cords, a bundle of intermediate slats having supporting tapes secured thereto and a lowermost slat.
Figures 22, 23:
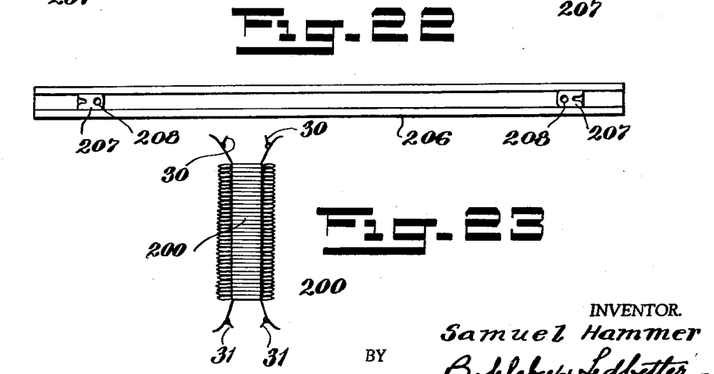
Figure 22 is a bottom view of the lowermost slat shown in Figure 21.
Figure 23 is an end view of the bundle of slats shown in Figure 21.

My invention is particularly adapted, though not necessarily limited, to facilitating the attachment or assembly of the tapes 20 on the edge face of a blind slat. One form of slat, here shown by way of example, is preferably made of thin sheet metal strips, see Figure 16, stiffened by having the edges thereof bent over with respect to the plane of the strip. The formation of the stiffening edges at each side of the slat also gives to the same, from the standpoint of overall cross-sectional thickness, the appearance of stability similar to that of wooden slats in common use. A plurality of said slats 149 bundled together face to face are shown in Figures 20, 21 and 23. The blanks from which each of these slats are made were formed with suitably proportioned and properly located perforations which in the formation of the slat were disposed in the edge face thereof as shown at 150 in Figures 17 and 20 to receive the clips 22, as illustrated in Figure 16. Moreover, when the edge faces of the strips are bent and the slats are finally formed, as illustrated and described, the clip perforations 150 are disposed therein about axes parallel to what may be described as the upper and lower major surfaces of the finished slat. In other words, these perforations are disposed in the edge face of the slat and lie wholly between its upper and lower major surfaces. An important reason for forming the slat in this manner is to be able, with the clip means above described, to fasten the tapes to the slats so that when the finished blind is elevated the slats will nest together face to face making the bundling height of the slats no greater than the summation of the thicknesses of the several slats of the blind. Heretofore the tapes of certain forms of Venetian blinds have been fastened to the slats by means passing through the upper and lower major surfaces of the slat with the result that when the blind is elevated either the fastening means or portions of the tapes themselves are interposed between adjacent slats which necessarily prevented them from contacting or nesting together face to face, as I prefer to construct my blind.

An important feature in the method of assembling my blind is the fact that the raising and lifting cords and particularly the tapes, as I shall more particularly describe hereinafter, may be assembled while all of the slats of the blind are nested together in a bundle face to face, as shown in Figures 21 and 22.

*Tape-slat assembling mechanism*

Figure 18:
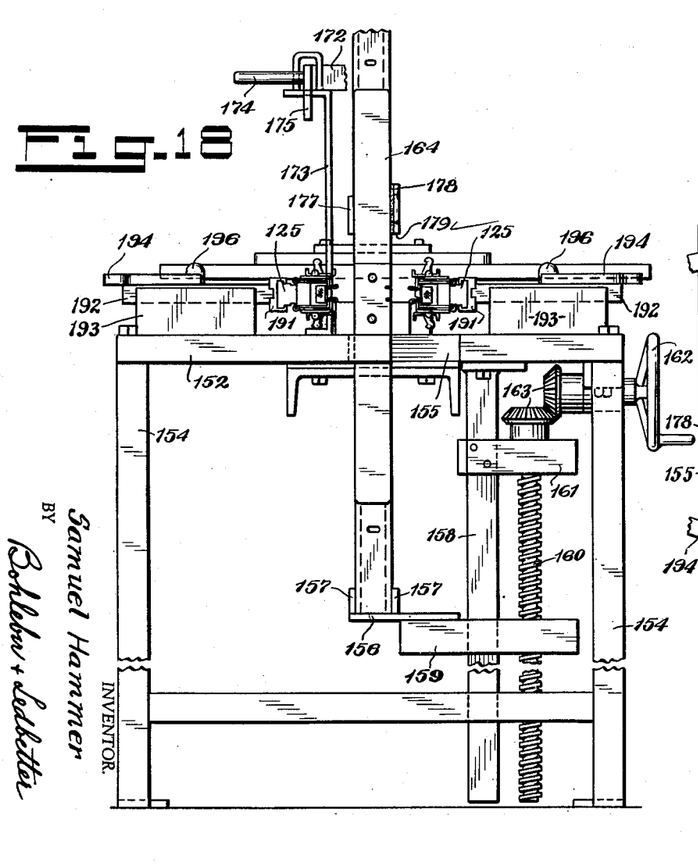

In Figures 15 to 20 I illustrate what may be described as one form of tape-slat assembling machine. This device comprises a table-like member having a front portion 152 and a rear portion 153 supported on legs 154. An irregularly shaped opening 155 is formed in the front portion of the table. An adjustable slat support 156, having guides 157, is slidably mounted on a stationary bar 158, secured to and depending from the under-surface of the table, by means of a movable bar 159 through which said stationary bar 158 passes. The bar 159 is rendered vertically adjustable along the bar 158 by means of a screw 160 rotatably mounted in a bearing 161 fixed to the bar 158; said screw 160 passing through an internally threaded hole in said bar 159. As seen in Figures 17 and 18 a hand wheel mechanism 162 comprising bevel gears 163 is mounted at the side of the machine in any suitable way for raising and lowering the support 156 to any desired position.

A stationary jaw 164 is mounted on the front of the table at one side of the opening 155 and directly opposite a movable jaw 165. Both of these jaws are disposed within the opening 155 and extend for a distance above and below the table as shown in Figures 17 and 18. The movable jaw 165 is carried by a sliding member 166 mounted in any suitable guide or mounting means 167 for a horizontally slidable movement. A stop 168 on the table 153 is provided to limit the opening sliding movement of the member 166 and jaw 165. While any suitable mechanism may be provided for propelling the jaw 165 toward and away from the jaw 164, I prefer to use, and here illustrate, a pneumatic device 169 mounted on the table 153, which device has a piston element 170 connected to the bar 166. The pneumatic device 169 comprises any suitable control valve means 171. The valve means, here shown, is operated by a bar 172 slidably mounted on a support 173 and having a handle 174 disposed at the front of the machine in an accessible position. Stops 175 and 176 on the bar 172 limit the movement thereof between an "off" or open and an "on" or closed position. A rigid guard 177 is secured to the stationary jaw 164 and a movable guard 178 is hinged at 179 to the movable jaw 165.

Figure 19:
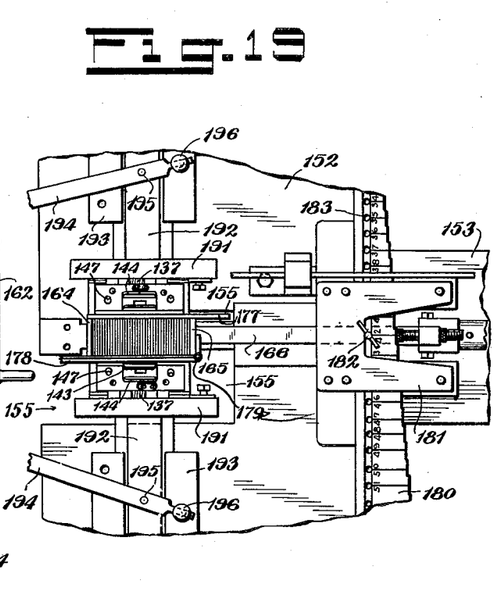
Figure 19 is an enlarged fragmentary view of the front portion of the machine shown in Figure 15 with the magazines and slats in a position just prior to the opening of the magazines, as shown in Figure 16.

The amount of the closing movement of the jaw 165 is variably limited by means including a graduated bar 180 slidably mounted in any suitable way on the top of the member 167 and confined in that position by a splined cover plate 181. The graduations on the bar 180 are numbered consecutively from 31 to 51 indicating progressive unit changes in the width of the bar between these indicated limits. A pin 182 passing through the plate 181 is adapted to cooperate with any one of a plurality of holes 183 drilled in the bar 180 and corresponding respectively to each graduation. As shown in Figures 15 and 19, the bar 180 is set at graduation number 42 with the pin 182 disposed in the corresponding hole 183, not shown. An adjustable stop 184, adapted to cooperate with the bar 180 at the various graduation points is provided on the sliding member 166, and comprises a screw 185 threaded through a boss 186 on the upper edge of the sliding member 166 and a lock nut 187.

A magazine carrier 190 is movably mounted in any suitable way on the table 152 at each side of the jaws 164 and 165. In the form of device here shown each of the carriers 190 comprises a T-shaped structure having a head 191 and a stem 192, of dove-tailed cross section, slidably mounted in a suitable bearing 193 secured to the top of the table. A manually operable bar 194, pivoted intermediate its ends to the stem 192 by means of a pin 195 and having one end thereof fixed to the bearing 193 by any suitably rotatable lost-motion connecting means 196 is provided for manually moving the carrier 190 at the will of the operator to and from the jaws 164 and 165 and any slats clamped therein. In the head 191 of the carrier 190 is formed a slot 193 adapted to slidably receive the T-shaped top portion 125 of the tape magazine, above described. A stop 199 is provided in the slot 198 to locate the magazine in the carrier at what may be described as a home position. It will be understood that in all essential respects the two carriers shown are the same and for that reason the corresponding parts thereof are similarly numbered.

From the above it will be understood that when the vise-like jaws 164 and 165 are opened, as shown in Figure 17, a plurality of Venetian blind slats 149 stacked together face to face in the form of a bundle 200 may be placed in the machine with their lower ends resting on the support 156 between the guides 157, against the stationary jaw 164 and the rigid guard 177 secured thereto. Thereafter the hinged guard 178 is closed, as shown in Figure 15, against the slats to hold the same against the guard 177. Figure 19 illustrates the position of the movable jaw 165 after the pneumatic device has been operated and the same moved forward to grip and compress the slats 149 a predetermined amount; the amount of said compression being varied as desired by means of the adjustable stop 184. When the machine is set at the numeral 42, as here shown, it indicates that 42 Venetian blind slats will be required, having in mind the throw of the movable jaw 165 to properly clamp and compress the same between the jaws 164 and 165. If it is desired, for instance, to compress 48 slats the pin 182 may be withdrawn from the bar 180 and the latter moved to a position in which the graduation 48 is disposed opposite the stop 184, whereupon the pin 182 is replaced to hold the bar in said position. When the slats are gripped between the jaws 164 and 165 the perforations 150 in the edge face thereof, as shown in Figures 17 and 20, will be in exact alignment. The slats will also be compressed sufficiently to make the center distances between adjacent perforations 150 approximately .098 of an inch and therefore correspond to the spacing of the clips 22 in the loaded tape magazines above described.

The slats shown in Figure 17 are adapted for use in the manufacture of Venetian blinds comprising three supporting tapes on each side thereof and therefore comprise three groups of perforations 150. The slat support 156 is here shown adjusted to the position it will occupy when the center tapes are being assembled to these slats and the middle group of perforations are directly aligned with the clips of the loaded tape magazines so that all of the clips of the tapes may be simultaneously pressed into the perforations 150 by moving the handles 194 toward the center of the machine.

When it is desired to assemble the tapes on the slats of a Venetian blind having only two supporting tapes on each side, and also assemble the tapes on the ends of the slats shown in Figure 17, the adjustable slat support 156 may be moved upwardly to the desired position so that, after the tapes are assembled on one end, the bundle of slats may be reversed in the machine or turned end for end in order to assemble the tapes on the other end without changing the adjustment of the support 156.

It was pointed out above that the flanges 144 on the side catches 141 of the tape magazines were disposed below or extended beyond, the lower surface of the flanges 134. It will now be understood that this construction permits said flanges on a loaded magazine to abut the edges of a bundle of slats above and below the perforations 150 after the clips 22 have been inserted therein and toward the latter part of the throw of the bars 194 and thereby release the upper edge of the opening 142 in the catch from the notches 145 and permit the magazine to open under the influence of the springs 137 and plungers 145 and leave the clips secured to the edge face of the slats. Figure 16 illustrates the relative positions of the slats, clips, tapes, magazines and carriers after this releasing operation. Moreover, it shows how the magazine may be removed from the machine by being drawn forward out of the slots 198 and leave the tapes secured to the slats by means of clips. The carriers 190 may then be moved away from the slats and made ready to be reloaded. After the magazine is thus removed the operation further creases the tapes at 121 by pinching the loops together. These creases previously made during the gathering operation are thereby set in the tapes with such permanence that they will thereafter fold on said creases when the blind is in use and in the normal operation of the blinds prevent the tapes from inadvertently bending inwardly between the slats when the blind is elevated.

During an inspection operation prior to assembling the tapes on the slats as above described, the proper number of slats are gathered and tied together in regular bundles in any suitable way. Figure 21 illustrates a bundle 200 tied together by a paper band 201 which surrounds the same. The ends of the band are pasted together so that it may remain on the bundle while the tapes are being fastened thereto and the blind is otherwise being finally assembled.

The final steps in my method of manufacturing Venetian blinds may be described best by reference to Figure 21 showing a head bar 202 comprising any suitable mechanism for tiltably mounting thereon an uppermost slat 203 and rendering the same operable by means of cords 204 and 205. These parts may be referred to collectively as a head bar unit. The bundle of slats 200, comprising the tapes assembled thereto, may be referred to as an intermediate slat unit. A lowermost slat 206, see Figure 22, having a cord anchoring fixture 207, at each side of cord holes 208 formed therein, may be described as the lower slat unit. It will be seen that perforations 150 are formed in the edge faces of slats 203 and 206 similar to those in slats 149, except that they are properly positioned and proportioned to receive the elongated clips 30 and 31 secured to the ends of tapes 20 as above described. It will be understood that all of the slats 149 and slat 203 are provided with cord holes, not shown, corresponding in size and position to the holes 208 in the lower slat 206.

The assembling operations of my blind comprise, in addition to the various steps above described, that of threading through the left-hand end of the head bar 202 and slat 203, bundle of slats 200, and slat 206, a raising and lowering cord 209 and anchoring the end thereof in any suitable way in the left-hand fixture 207 while the units are lying on an assembling table, not shown. Similarly, a cord 210 is threaded through these units at the right-hand ends thereof and anchored to the bottom of slat 206 in the right-hand fixture 207. The cords 209 and 210 are then disposed about any suitable guide pulleys or other means to permit the same to hang from the right-hand end of the head bar, as shown in Figure 21. Thereafter, the various units are drawn together and the clips 30 and 31 on each side of the tapes 20 are pressed by hand into the perforations 150 on each side of the slats 203 and 206. In the interest of clarity, Figure 21 illustrates these three blind units as being spaced a little further apart during the assembling operation described than is actually necessary and thereby emphasize some of the novel features of my invention.

It will be seen from the above that I have described a method of assembling a Venetian blind having a head bar structure adapted to support a plurality of slats about a plurality of raising and lowering cords comprising the steps of stacking together a plurality of intermediate slats with the edge faces thereof exposed at each side of the stack; tying said bundle together with a band or other suitable means; and when occasion requires compressing said bundle a predetermined amount and during said compression connecting a plurality of slat supporting tapes at spaced intervals throughout the length of said tapes to the edge faces, respectively, of the slats, while said slats are retained in bundled or stacked formation and operatively connecting the head bar structure to one side of the stack of intermediate slats, and similarly connecting a lowermost slat to the other side of said stack by threading the raising and lowering cords through the stacked slats, and thereafter securing to said head bar structure and lowermost slat respectively, one end of each of said supporting tapes. It will also be understood that other types of slat engaging elements held in regular spaced relationship with respect to similarly spaced slats may be employed with any suitable mechanism for simultaneously connecting said elements to the edges of the slats.

I have found that my method of assembling Venetian blinds, as above described, is a marked improvement over that in present day practice because all but the upper and lower slats are disposed in a bundle which makes it a very simple operation to thread the raising and lowering cord therethrough and indeed requires very much less space in which to perform this assembling operation. In the past, as far as I am aware, Venetian blinds, particularly those employing what is known as ladder tapes, were assembled by disposing the slats one at a time on the ladders of a pair of depending tapes and thereafter separately threading the raising and lowering cords through each hole in each slat. This is a costly operation which I am able to avoid by the use of my invention. Moreover, so far as I am aware, my invention teaches, among other things, a novel manner of simultaneously affixing to a plurality of slats a tape like that described, and a device whereby such tapes may be simultaneously affixed to each side of a bundle of slats.

While I have described what now seems to be the preferred form of a device embodying my invention, and a preferred manner of practicing the same, various modifications therein may occur to those skilled in the art and no specific limitation is intended by the phraseology of the foregoing description or illustrations in the accompanying drawings.

What is claimed is:

1. In a device of the class described comprising a pair of spaced guide strips for slidably supporting a Venetian blind tape having slat engaging means secured thereto at spaced intervals adapted to hang downwardly between said strips; a slidably extendible and contractible mechanism for pleating the tape supported by said strips; said mechanism including a plurality of spaced points normally disposed below the space between said strips and which when elevated to a position between and above said strips are adapted, respectively, to bend the tape between each pair of slat engaging elements; means for elevating said mechanism; and means for extending and contracting said mechanism.

2. In a device of the class described comprising a pair of spaced guide strips for slidably supporting a Venetian blind tape having slat engaging means secured thereto at spaced intervals adapted to hang downwardly between said strips; a slidably extendible and contractible mechanism for pleating the tape supported by said strips; said mechanism including a plurality of spaced points normally disposed below the space between said strips and which when elevated to a position between and above said strips are adapted, respectively, to bend the tape between each pair of slat engaging elements; means for elevating said mechanism; and means independent of said elevating means for extending and contracting said mechanism.

3. In a machine for pleating an elongated flexible tape having slot engaging means secured thereto at spaced intervals, means for slidably engaging said tape throughout the length thereof; in combination with mechanism for bending said tape between each pair of slot engaging elements and sliding said elements along said tape engaging means toward one end thereof.

4. In a machine for pleating an elongated flexible tape having slot engaging elements secured thereto at spaced intervals, guide means for slidably engaging and supporting said tape throughout the length thereof; in combination with a tape magazine; and mechanism for bending said tape between each pair of slat engaging elements and thereafter sliding the same along said guide means and into said tape magazine, said magazine comprising means for gripping said elements.

5. In a machine for pleating an elongated fabric tape having slat engaging elements secured thereto at spaced intervals, means for slidably disposing all said elements in regular alignment, in combination with pleating mechanism movable with respect to said alignment means including a point corresponding to each element, said points being carried on an extensible and contractible fabric conveyor for successively engaging and spacing with respect to one another said slat engaging elements and moving the same to one end of said alignment means.

6. A machine for pleating an elongated fabric tape having slat engaging elements secured thereto at spaced intervals, comprising a tape magazine, and means for slidably disposing all said elements in regular alignment, in combination with mechanism movable with respect to said alignment means for disposing said tape and elements in said magazine, said mechanism including a point corresponding to each element, said points being carried on an extensible and contractible fabric conveyor for successively engaging and spacing said elements with respect to one another and moving the same from said alignment means to said magazine without changing said regular alignment or the spacing established between said elements.

7. A machine for pleating an elongated fabric tape having secured thereto at spaced intervals, respectively, a plurality of slat-engaging clips comprising; means for slidably mounting all said clips in regular alignment, a tape magazine disposed at one end of said mounting means for receiving a pleated tape, and an extensible and contractible fabric conveyor mechanism for progressively pleating said tape and depositing the same in said magazine, said mechanism including drag means adapted to cooperate with the end of said mounting means for resisting the deposition in said magazine of said tape.

8. In combination with a device of the class described, a magazine for holding a Venetian blind tape formed into a plurality of pleats and having slot engaging elements secured to and projecting from each pleat, comprising a body portion, side pieces secured to said body portion forming a tubular cavity with a slot-shaped opening at one side thereof, said side pieces being adapted to envelope a pleated tape and align said elements proximate said opening, means for releasably gripping said elements, and means for releasing said gripping means.

9. In combination with a device of the class described, a magazine for holding a Venetian blind tape formed into a plurality of pleats and having slat engaging elements secured to and projecting from each pleat, comprising means forming a tubular cavity with a slot shaped opening at one side thereof, said means being adapted to envelope a pleated tape and align said elements proximate said opening, means for releasably gripping the slat engaging elements, and means for releasing said gripping means.

10. A magazine device for holding a Venetian blind tape formed into a plurality of pleats and having slat engaging elements secured to and projecting from each pleat, comprising, means forming a tubular cavity with a slot-shaped opening at one side thereof adapted to envelope a pleated tape and align said elements proximate said opening, in combination with means operable in said cavity for spacing said elements along said opening, said last named means including yieldable means for resisting the deposition in said magazine of a pleated tape, means on said magazine for releasably gripping and holding in spaced relation to one another said slat engaging elements, and means for releasing said gripping means.

11. A machine for gathering a Venetian blind tape comprising in combination guide means for slidably supporting and engaging throughout the length thereof an elongated flexible tape having slat engaging elements secured thereto at spaced intervals, and mechanism for bending away from said guide means portions of said tape disposed thereon between adjacent pairs of said elements and thereafter sliding said tape along said guide means toward one end thereof.

12. Apparatus for preparing a Venetian blind tape having slat engaging elements secured thereto at equally spaced intervals, comprising in combination, a pair of guide strips spaced apart so that the tape is adapted to be disposed upon one side of both strips and the slat engaging elements upon the other side of both strips and along which the elements are slidable, means movable lengthwise with respect to said guide strips and adapted to engage the elements to pleat the tape, to deliver the pleated tape to a magazine and to retain the slat engaging elements in a predetermined spaced relation when pleated, a magazine for holding the tape when pleated including means on said magazine for releasably gripping said slat engaging elements and retaining them in the predetermined spaced relation, and means carried by the magazine for retaining the same in position with respect to the guide strips to receive a pleated tape.

13. Apparatus for preparing a Venetian blind tape having slat engaging elements secured thereto at equally spaced intervals, comprising in combination, a pair of guide strips spaced apart so that the tape is disposed upon one side of both strips and the slat engaging elements are disposed upon the other side of both strips and along which the elements are slidable, a fabric conveyor adjacent to the guide strips, a plurality of spaced points carried by the conveyor and one point being disposed between each slat engaging element to bend the tape therebetween, means slidably supporting the conveyor and hence the spaced points, means for sliding the spaced points so that each engages a slat engaging element to pleat the tape, to retain the slat engaging elements in a predetermined spaced relation, and to deliver the pleated tape to a magazine, a magazine for holding the tape when pleated including means on said magazine for releasably gripping said slat engaging elements and retaining them in the predetermined spaced relation, and means carried by the magazine for retaining the same in position with respect to the guide strips to receive the pleated tape.

14. Apparatus for preparing a Venetian blind tape having slat engaging elements secured thereto at equally spaced intervals, comprising in combination, a pair of guide strips spaced apart so that the tape is disposed upon one side of both strips and the slat engaging elements are disposed upon the other side of both strips and along which the elements are slidable, a carriage adjacent the strips, means to move the carriage towards and away from the strips, a plurality of spaced points carried by the carriage and one being disposed between each pair of slat engaging elements to bend the tape therebetween when the carriage is moved towards the tape, means slidably supporting the spaced points, means for sliding the spaced points so that each engages a slat engaging element to pleat the tape, to retain the slat engaging elements in a predetermined spaced relation and to deliver the pleated tape to a magazine, a magazine for holding the tape when pleated including means on said magazine for releasably gripping said slat engaging elements and retaining them in the predetermined spaced relation, and means carried by the magazine for retaining the same in position with respect to the guide strips to receive the pleated tape.

15. Apparatus for preparing a Venetian blind tape having slat engaging elements secured thereto at equally spaced intervals, comprising in combination, a pair of guide strips spaced apart so that the tape is disposed upon one side of both strips and the slat engaging elements are disposed upon the other side of both strips and along which the elements are slidable, a carriage adjacent the strips, means to move the carriage towards and away from the strips, a fabric conveyor on the carriage and adjacent to the guide strips, a plurality of spaced points carried by the fabric conveyor and one being disposed between each pair of slat engaging elements to bend the tape therebetween when the carriage is moved towards the tape, means slidably supporting the spaced points, means for sliding the spaced points so that each engages a slat engaging element to pleat the tape, to retain the slat engaging elements in a predetermined spaced relation and to deliver the pleated tape to a magazine, a magazine for holding the tape when pleated including means on said magazine for releasably gripping said slat engaging elements and retaining them in the predetermined spaced relation, and means carried by the magazine for retaining the same in position with respect to the guide strips to receive the pleated tape.

16. A magazine for holding a Venetian blind tape having slat engaging elements secured thereto at equally spaced intervals when the tape has been pleated comprising a body portion having a cavity to receive the pleated tape, jaw means disposed on each side of said cavity for releasably gripping said slat engaging elements and retaining them in a predetermined spaced relation, a locking means to retain the jaw means in gripping position having a latch and a keeper, a portion of the latch projecting beyond the jaw means for releasing the locking means.

17. A magazine for holding a Venetian blind tape having slat engaging elements secured thereto at equally spaced intervals when the tape has been pleated comprising a body portion having a cavity to receive the pleated tape, inwardly directed flanges carried by the body portion for engaging the tape upon the inner side and the slat engaging elements upon the other side, a pivoted jaw disposed on each side of said cavity for releasably gripping said slat engaging elements and retaining them in a predetermined spaced relation, spring means for urging the pivoted jaws outwardly, locking means to retain the jaws in gripping position having a latch and a keeper, a portion of the latch projecting beyond the jaws for releasing the locking means.

SAMUEL HAMMER.